United States Patent [19]

Franklin

[11] Patent Number: 4,850,627
[45] Date of Patent: Jul. 25, 1989

[54] PACKAGE HANDLING METHOD AND APPARATUS

[75] Inventor: Kenneth W. Franklin, Knightcote, England

[73] Assignee: Bishopbarn Limited, Leamington Spa, England

[21] Appl. No.: 146,417

[22] Filed: Jan. 21, 1988

[30] Foreign Application Priority Data

Jan. 22, 1987 [GB] United Kingdom ............. 8701347

[51] Int. Cl.⁴ .................................. B66C 1/02
[52] U.S. Cl. ............................. 294/2; 294/64.1
[58] Field of Search .............. 294/2, 65, 64.1, 119.1, 294/907; 414/28, 121, 737, 744 B, 752, 797, 796.2; 271/90, 106, 92; 901/40

[56] References Cited

U.S. PATENT DOCUMENTS 2,716,497 12/1953 Wahl et al. .......................... 214/6
3,523,707 8/1970 Roth .................................. 294/65
3,743,340 7/1973 Williamann ......................... 294/64

FOREIGN PATENT DOCUMENTS 0163201 12/1985 European Pat. Off. .
1756327 4/1970 Fed. Rep. of Germany ........ 294/65
2263477 12/1972 Fed. Rep. of Germany ..... 294/64.1
1041653 2/1964 United Kingdom .
1246485 6/1968 United Kingdom .
2062577 11/1979 United Kingdom .
2113178 1/1983 United Kingdom .

Primary Examiner—Robert B. Reeves
Assistant Examiner—Dean J. Kramer
Attorney, Agent, or Firm—Davis, Bujold & Streck

[57] ABSTRACT

A method of transferring a collation of flexible packages from a first location to a second location employs a loading head comprising an enclosure having an opening and a permeable barrier extending across the opening. The method comprises the steps of bringing the opening and the collation together at the first location, applying suction to the enclosure, thereby drawing air into the enclosure through the permeable barrier, drawing the packages against the barrier by the air drawn through the permeable barrier, and thus expanding upper regions of the packages towards one another by sub-atmospheric air pressure created by the suction. The packages tend to seal against one another and to prevent flow of air through the collation, so that the collation is held by suction against the barrier. The enclosure is transferred to the second location and the suction is removed to release the collation from the enclosure. Apparatus for carrying out this process incorporates a motor-driven radial flow fan without an external shroud mounted on the enclosure to generate the suction.

9 Claims, 5 Drawing Sheets

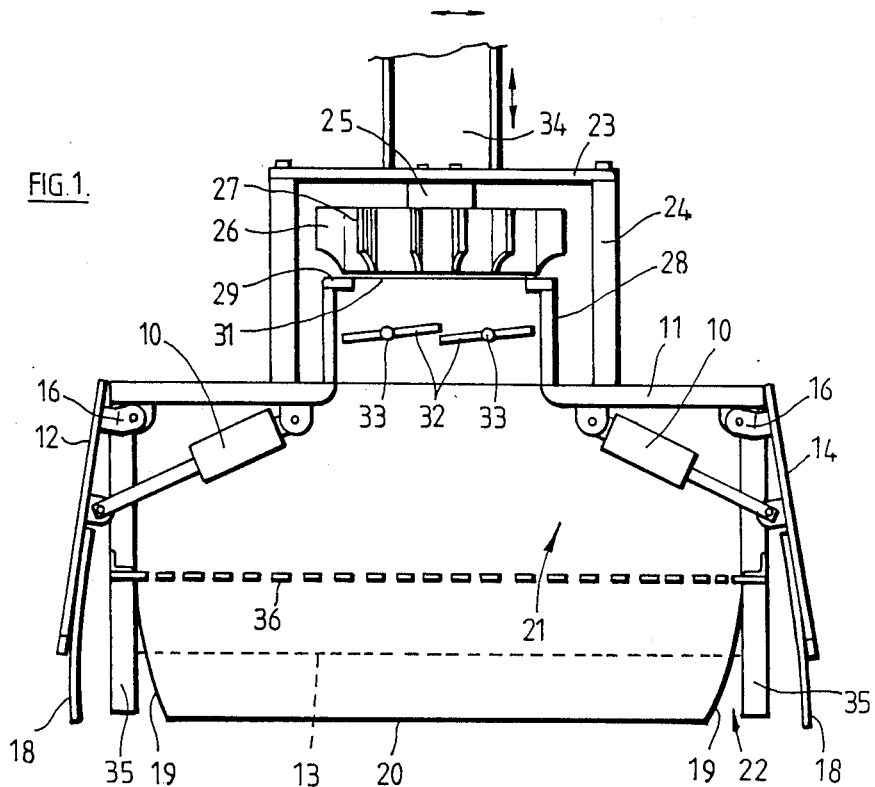
FIG.1.
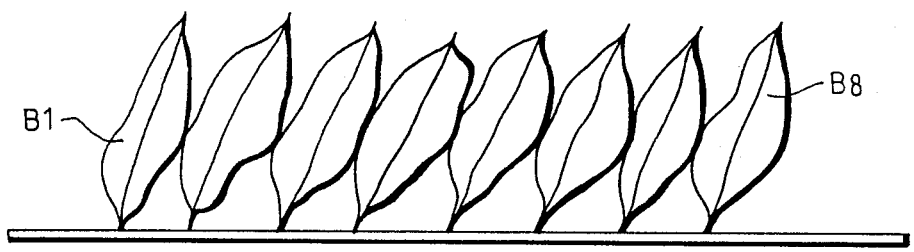

PACKAGE HANDLING METHOD AND APPARATUS

BACKGROUND TO THE INVENTION

The invention relates to package handling method for transferring collations of flexible packages from a first location to a second location and to a corresponding package handling apparatus.

In package handling systems such as an installation for collating a number of packages and loading them into a carton, it is often convenient to lift the packages from above, for example, to transfer them from a conveyor to a carton or from one conveyor to another conveyor. A well established procedure for lifting packages from above is to employ suction heads against which packages are drawn. One known way of handling a collation of packages is to provide a matrix of several suction heads, for example twenty such heads arranged in a 4×5 matrix, to lower the matrix over a collation of packages and then to apply suction to the heads to support the collation on the matrix of heads. Conventional heads of this kind require a relatively high vacuum. They are normally supplied from continuously running suction pumps. In order to provide sufficient suction for most of the heads when one or perhaps two other heads are not closed off by a package, the pump requires sufficient capacity to generate an appropriate level of suction even with unrestricted flow through a small number of heads. An inevitable result is a requirement for a large capacity suction pump which is expensive to install and operate, runs noisily and generates unrequired heat. In a factory environment with several such installations side by side, the noise and heat provide undesirable working conditions. An arrangement of this kind can only be used if the individual packages have sufficient flat or nearly flat areas on their upper sides.

It is already known, for example from Wahl et Al U.S. Pat. No. 2,716,497 to employ a single large loading head comprising an enclosure having an opening, a permeable barrier extending across the opening and suction within the enclosure to hold a collation of packages against the barrier and thereby enable the complete collation to be transferred from one location to another. Arrangements of this kind are known either for rectangular shaped packages which form closely packed collations or with a requirement for very large flow rates requiring noisy and power consuming pumps or fans to compensate for leakage around packages which do not nest closely together. For the latter, see for example UK Published Patent Application No. 2113178A.

An object of the present invention is to provide an improved package handling process and an associated apparatus in which disadvantages of prior proposals can be reduced or overcome.

SUMMARY OF THE INVENTION

According to one aspect of the invention a method of transferring a collation of flexible packages from a first location to a second location employing a loading head comprising an enclosure having an opening and a premeable barrier extending across the opening comprises the steps of bringing the opening and the collation together at the first location, applying suction to the enclosure, thereby drawing air into the enclosure through the premeable barrier, drawing the packages against the barrier by said air drawn through the permeable barrier, expanding upper regions of the packages towards one another by sub-atmospheric air pressure created therearound by said suction whereby the packages tend to seal against one another and to prevent flow of air through the collation, whereby the collation is held by suction against the barrier, transferring the enclosure to said second location and removing said suction to release the collation from the enclosure.

Preferably the method includes the steps of moving side walls of the enclosure outward to provide an opening larger than the collation, engaging the enclosure over the collation, then moving the side walls inward after engaging the enclosure over the collation.

According to a second aspect of the invention package handling apparatus for carrying out the method defined above comprises an enclosure having an opening, an air-permeable barrier extending across the enclosure and defining a package support location adjacent the barrier, means for applying suction to the enclosure comprising a motor-driven fan mounted on the enclosure, the fan being a radial flow fan without an external shroud whereby air is discharged in generally radial directions around the whole circumference thereof. A fan of this kind permits a light weight fan and motor combination which can be moved easily with the enclosure and which provides a high flow rate of air without high undue noise or power consumption and heat generation.

Preferably the fan is an impeller having blades inclined to a radial direction such that their outer edges trail behind the inner edges.

The apparatus may further comprise a valve constituted by at least one flap arranged between the fan and the interior of the enclosure and constituting means for removing said suction to release the collation from the enclosure.

The enclosure may have side walls extending below the barrier. These side walls may be tiltable outward to temporarily enlarge the downwardly directed opening. The sidewalls may comprise outer rigid plates and inner flexible elements extending below the outer plates whereby the flexible panels can be drawn in by suction to engage the collation.

The apparatus may be provided with means to adjust the height of the air permeable barrier within the enclosure, thereby adjusting the effective length of the side walls extending therebelow.

BRIEF DESCRIPTION OF THE DRAWINGS

Embodiments of the invention will now be described with reference to the accompanying drawings in which:

FIG. 1 is a diagrammatic sectional elevation of package handling apparatus in accordance with the invention in one configuration prior to collecting a collation of packages;

DESCRIPTION OF A PREFERRED EMBODIMENT

Figure 2:
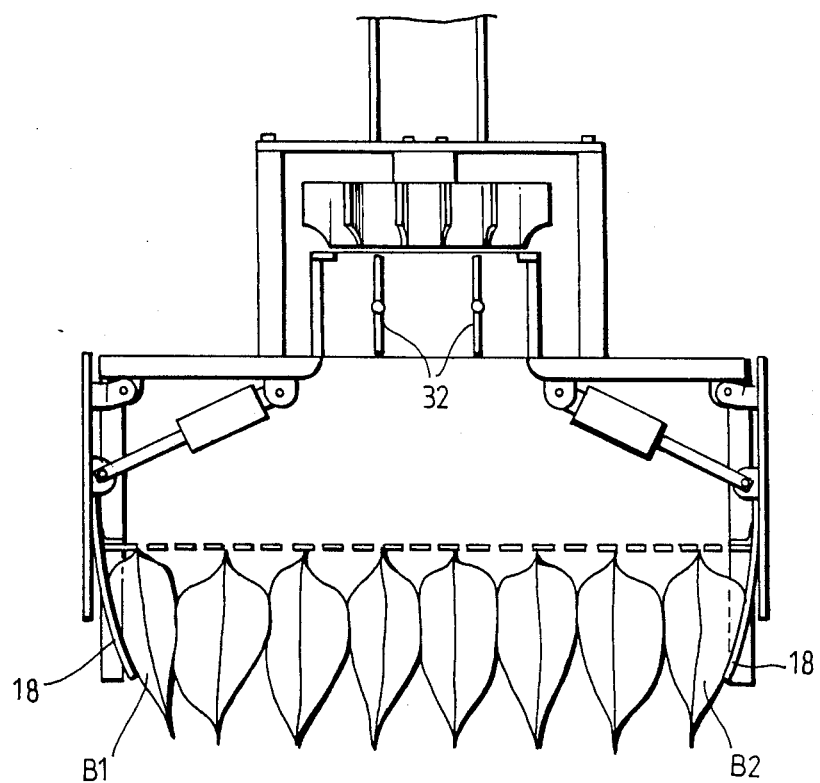
FIG. 2 is a corresponding view after collecting the collation of packages.
Figure 3:
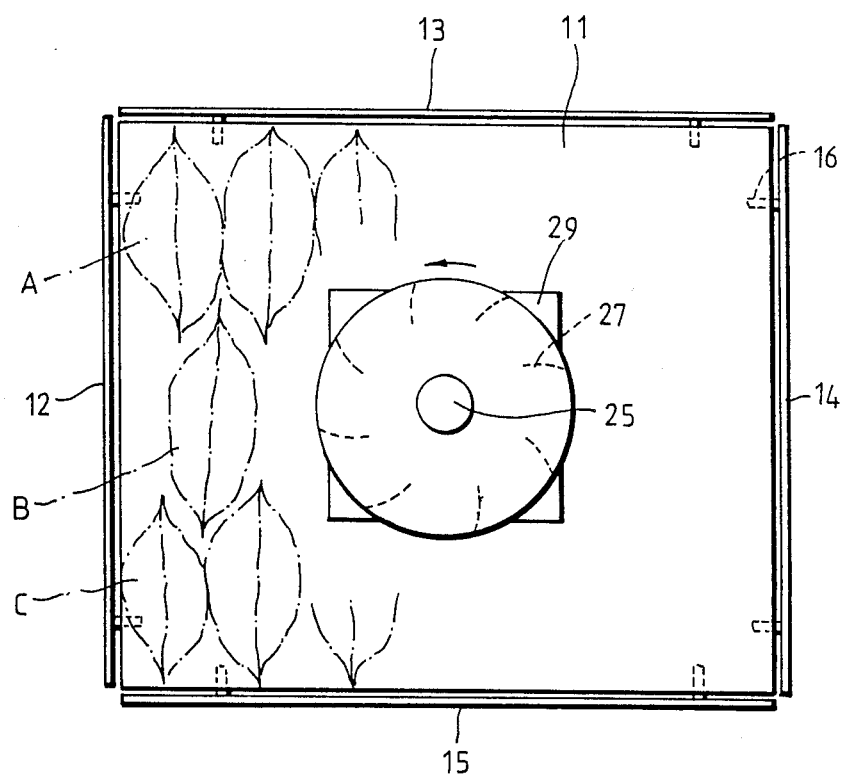
FIG. 3 is a plan view of the apparatus with upper parts removed.

The apparatus shown in FIGS. 1, 2 and 3 is a loading head intended primarily for lifting and transporting a collation of flexible packages such as packages of potato crisps and for loading the collation into a carton to constitute a complete layer within the carton. As illustrated in FIGS. 1, 2 and 3, the collation may be constituted by three rows A, B and C, each of eight packets, for example B1 to B8 for row B, each packet standing on edge. As well as potato crisps, the apparatus may be used for other packages of snack foods. The invention is particularly appropriate with high-bulk light-weight products but could also be used with heavier weight flexible packages.

The loading head comprises an upper rectangular support member 11 formed from a metal plate. Four rectangular side walls 12, 13, 14, and 15 are connected one to each side of the rectangular support member 11. The side walls extend down from the support member and are each pivoted to the support member by pivots 16 such that they can pivot between an outer position shown in FIG. 1 and an inner position shown in FIG. 2. Hydraulic cylinder assemblies 10 control the pivoting of the side walls 12, 13, 14 and 15. Each side wall such as side wall 12 is in the form of a rigid plate 17 supporting a flexible inner panel 18. Panel 18 has sufficient rigidity to maintain a flat or slightly curved form when unloaded but is sufficiently flexible to be flexed when a load is applied as will be described below To allow the flexible panels to flex inward without interfering with each other, their ends are curved inward as shown at 19 for panel 20 of side wall 13. The support member 11 together with the four side walls define a rectangular enclosure 21 with a downwardly directed opening 22.

Support member 11 carries an upper plate 23 on four vertical members 24. An electric motor 25 is mounted on the upper plate 23 and is arranged to drive a radial flow fan 26. Fan 26 is what is known as a backwards facing impeller. The name derives from the fact that its generally radial blades 27 are inclined to a radial direction such that their outer edges trail behind the inner edges. Typical blade configuration is shown in FIG. 3 which also indicates that the blades are curved. The direction of rotation is indicated by an arrow. A fan of this kind draws air from a central region and expels it radially. The action is partially centrifugal and partly caused by the inclination and curvature of the blades. The fan has no external shroud so air is discharged in generally radial directions around the whole circumference of the fan.

An air-flow control unit 28 is mounted on the support member 11 and is positioned between the support member 11 and the fan 26. Member 28 is in the form of a rectangular box having an upper plate 29 with a circular aperture 31 forming the inlet to the fan. A series of two louvres or butterfly flaps 32 mounted on shafts 33 are pivotable to control the flow of air and thus constitute an air-flow control valve. The whole loading head is supported on a vertically and horizontally movable beam 34 by means of which the loading head can be moved from one location to another.

The support plate 11 also carried four vertically downward extending legs 35 which support an air permeable barrier 36 which extends across the enclosure 21. The barrier is for example formed by a perforated metal sheet. The vertical position of the barrier within the enclosure is adjustable for a purpose to be described subsequently.

Operation of the loading head is as follows. When installed in a typical installation for collating and packing packages such as potato crisps into cartons, the loading head is mounted in such a way as to be movable between a first location where it picks up a collation of packages to a second position where it deposits the collation. For example, it may pick up a collated layer at the end of a conveyor system and deposit the layer in a carton.

In order to pick up a collated layer, the side walls are pivoted out to the position shown in FIG. 1 giving an enlarged downward opening and the loading head is then lowered over the collation. FIG. 1 shows such a collation over which the loading head is about to be lowered. The extent to which the head is lowered is not absolutely critical but should be such that the packages project up into the enclosure. Once the head is in position, the side walls are pivoted inward to the position shown in FIG. 2.

Throughout the operating cycle of the loading head, the fan 26 runs continuously but the flaps 32 remain closed, thus preventing flow of air through the loading head.

Once the loading head is in position, the flaps 23 are opened and air flows upward through the loading head. The suction effect of the fan acting on the upper parts of the packages tends to expand these upper regions towards one another by the sub-atmospheric air pressure created around them so that the packages tend to seal against one another. At the same time, the packages are drawn positively up against the barrier. The sealing effect of the packages against one another tends to prevent air flow through the collation. Sealing around the edges of the collation is assisted by the flexible parts of the side walls which are drawn in by the suction to engage against the packages. The shapes of the ends of the side walls allow them to be drawn in without interfering with each other.

In this way, the collation of packages becomes positively held against the barrier 35 by the suction effect caused by the fan.

The fan causes a maximum pressure drop of only about 0.1 bar but in conjunction with the way that the packages seal against one another, this is sufficient to hold them firmly in position.

The collation of packages can then be transferred to a second location by movement of the loading head. At the second location, where the packages are to be discharged, the flaps 32 are closed. At the same time, the side walls are pivoted outward.

In the absence of suction, the collation is thus released from the loading head. It has been found that the orderly release of the complete collation is such that it can be released within a carton near the top of the carton and will then drop freely as a regular collation to the bottom of the carton. This feature simplifies the control of movements of the head as a whole when several layers are to be loaded one above another in a carton.

Figure 4:
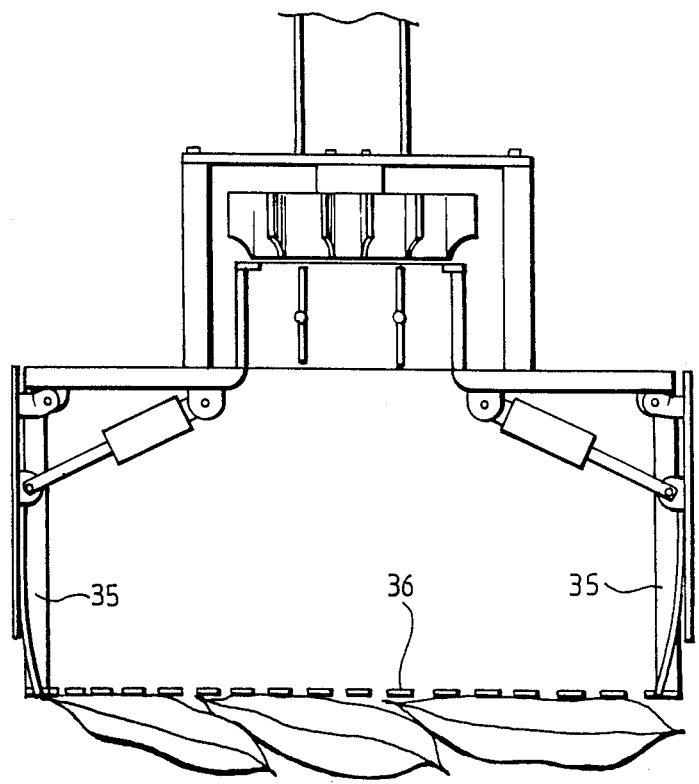
FIG. 4 is a corresponding view of the apparatus adapted for a different collation.

FIG. 4 shows the apparatus of FIGS. 1 to 3 adapted to handle a different kind of collation. The barrier 36 has been moved down its supports 35 so that it extends across the bottom of the enclosure 21. With this arrangement, the apparatus is particularly suitable for handling collations of packages which are lying down as shown. In the configuration of FIG. 4, the pivotal action of the side walls is not used.

Figure 5:
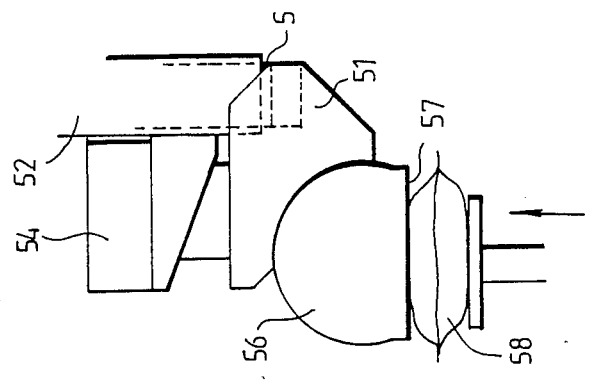
FIGS. 5 to 7 show an alternative form of apparatus in three different configurations in order to illustrate its operation.
Figure 6:
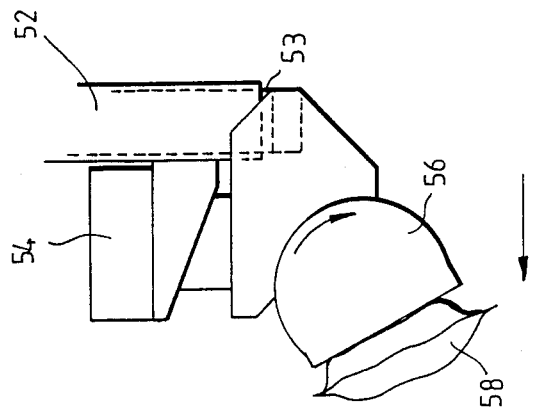
Figure 7:
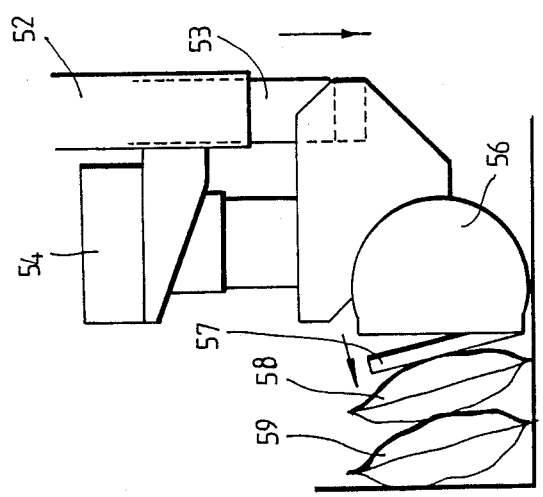

FIGS. 5 to 7 show a still further modification and illustrate that the loading head need not necessarily be use in a vertical position. This arrangement may be used for example to transfer a collation of two packages arranged side by side from a horizontal position to a vertical position in building up a larger collation.

A chamber 51 is mounted to be slidable vertically on a supporting column 52 by means of a slide member 53. The chamber 51 carries a motor driven fan 54 shown diagrammatically but corresponding generally to that of FIGS. 1 to 4. An air-flow control valve is positioned within an interconnecting passage 55 to control whether or not the fan draws air from the chamber 51. An enclosure 56 is in air flow communication with chamber 51 and is mounted to be pivotal on the chamber 51 as illustrated by comparing FIG. 5 with FIG. 6. An air permeable barrier 57 is arranged across an opening in what is the bottom of the enclosure in the position shown in FIG. 5. In order to pick up a collation of two or three packages, only one being shown because the packages are one behind the other in the view shown, the barrier 57 is brought into contact with the collation and suction is applied to the interior of the enclosure by the fan 54 by opening the valve. In this way, the loading head picks up the collation of packages. The collation is then transferred with a combination of translational and pivoting movement of the enclosure 56, through the position shown in FIG. 6 to that shown in FIG. 7. FIG. 7 illustrates a previously deposited collation 59 of packages against which the current collation 58 has been brought to rest by the loading head Suction is removed by closing the valve.

This tends to release the collation 58 but to ensure complete and positive release in a situation where the collation cannot fall away under gravity, the loading head is provided with a release mechanism by which the barrier 57 is temporarily tilted away from the enclosure 56 to ensure complete break of any remaining suction and to tilt the edges of the collation into a more stable inclined position. After this transfer, the loading head is returned to the position shown in FIG. 5 and a further cycle can be carried out.

The apparatus shown in FIGS. 5 to 7 may for example be used in building up sub-collations of a small number of packages into a large and complete collation as handled by the apparatus of FIGS. 1 to 3. Details of the apparatus of FIGS. 5 to 7 which have not been described, correspond to those described in relation to FIGS. 1 to 3.

I claim:

1. A method of transferring a collation of flexible packages from a first location to a second location employing a loading head comprising an enclosure having an opening and a permeable barrier extending across the opening comprising the steps of bringing the opening and the collation together at the first location, applying suction to the enclosure, thereby drawing air into the enclosure through the permeable barrier, drawing the packages against the barrier by said air drawn through the permeable barrier, expanding upper regions of the packages towards one another by sub-atmospheric air pressure created therearound by said suction whereby the packages tend to seal against one another and to prevent flow of air through the collation, whereby the collation is held by suction against the barrier, transferring the enclosure to said second location and removing said suction to release the collation from the enclosure.

2. A method according to claim 1 including the steps of moving side walls of the enclosure outward to provide an opening larger than the collation, engaging the enclosure over the collation, then moving the side walls inward after engaging the enclosure over the collation.

3. Package handling apparatus for carrying out the method of claim 1 comprising an enclosure having an opening, an air-permeable barrier extending across the enclosure and defining a package support location adjacent the barrier, means for applying suction to the enclosure comprising a motor-driven fan mounted on the enclosure, the fan being a radial flow fan without an external shroud whereby air is discharged in generally radial directions around the whole circumference thereof.

4. Apparatus according to claim 3 wherein the fan is an impeller having blades inclined to a radial direction such that their outer edges trail behind the inner edges.

5. Package handling apparatus according to claim 3 further comprising a valve constituted by at least one flap arranged between the fan and the interior of the enclosure and constituting means for removing said suction to release the collation from the enclosure.

6. Package handling apparatus according to claim 3 wherein the enclosure has side walls extending below the barrier.

7. Apparatus according to claim 6 wherein the side walls are tiltable outward to temporarily enlarge the downwardly directed opening.

8. Apparatus according to claim 6 wherein the sidewalls comprise outer rigid plates and inner flexible panels extending below the outer plates whereby the flexible elements can be drawn in by suction to engage the collation.

9. Apparatus according to claim 3 comprising means to adjust the height of the air permeable barrier within the enclosure, thereby adjusting the effective length of the side walls extending therebelow.

* * * * *